United States Patent
Kamstrup (10) Patent No.: US 9,917,943 B2
(45) Date of Patent: Mar. 13, 2018

(54) AUTOMATIC PROMPT AT CALL-END

(71) Applicant: GN Audio A/S, Ballerup (DK)

(72) Inventor: Lisa Rørbæk Kamstrup, Ballerup (DK)

(73) Assignee: GN Audio A/S (DK)

( * ) Notice: Subject to any disclaimer, the term of this patent is extended or adjusted under 35 U.S.C. 154(b) by 0 days.

(21) Appl. No.: 15/377,325

(22) Filed: Dec. 13, 2016

(65) Prior Publication Data

US 2017/0180534 A1 Jun. 22, 2017

(30) Foreign Application Priority Data

Dec. 21, 2015 (EP) .................................... 15201452

(51) Int. Cl.
*H04B 7/00* (2006.01)
*H04M 1/725* (2006.01)
*H04W 4/02* (2018.01)

(52) U.S. Cl.
CPC ...... *H04M 1/7253* (2013.01); *H04M 2250/02* (2013.01); *H04M 2250/74* (2013.01); *H04W 4/023* (2013.01)

(58) Field of Classification Search
CPC .......... H04M 1/7253; H04M 2250/02; H04M 2250/74; H04W 4/023
USPC ..................... 455/41.1, 41.2, 41.3
See application file for complete search history.

(56) References Cited

U.S. PATENT DOCUMENTS

| | | | |
|---|---|---|---|
| 6,834,042 B1 * | 12/2004 | Sugiyama | H04M 7/006 370/259 |
| 7,233,808 B2 | 6/2007 | Mooney et al. | |
| 8,433,245 B2 | 4/2013 | Matsuda | |
| 2003/0223604 A1 * | 12/2003 | Nakagawa | H04M 1/6066 381/311 |
| 2004/0053573 A1 * | 3/2004 | Karusawa | H04M 1/6066 455/41.2 |
| 2008/0089513 A1 * | 4/2008 | Kotzin | H04M 1/6041 379/420.01 |
| 2009/0305632 A1 * | 12/2009 | Sarkissian | H04M 1/6066 455/41.2 |
| 2013/0183901 A1 | 7/2013 | Joergensen | |

(Continued)

FOREIGN PATENT DOCUMENTS

EP 2485465 8/2012

OTHER PUBLICATIONS

European Search Report dated Jun. 29, 2016 for European patent application No. 15201452.8.

*Primary Examiner* — Md Talukder
(74) *Attorney, Agent, or Firm* — Altera Law Group, LLC (57) ABSTRACT

Disclosed is a first audio device comprising a speaker for reproduction of first audio signals, a microphone for reception of second audio signals, a first transceiver configured for establishing a wireless link according to a short-distance wireless technology, where the first audio device is configured for establishing the wireless link with a second audio device configured for establishing a call, where the first audio device is configured for transmission of the first and second audio signals of the call via the wireless link, wherein the first audio device is configured for detecting a call-end request during the call, wherein the first audio device is configured for, upon detecting the call-end request, inquiring whether the wireless link between the first audio device and the second audio device should be disconnected.

20 Claims, 7 Drawing Sheets

(56) References Cited

U.S. PATENT DOCUMENTS

| | | | | |
|---|---|---|---|---|
| 2013/0281152 A1* | 10/2013 | Nishimura | ............ | H04M 1/026 455/550.1 |
| 2013/0316687 A1* | 11/2013 | Subbaramoo | ......... | H04M 1/605 455/418 |
| 2014/0113615 A1* | 4/2014 | Yao | ..................... | H04M 1/6066 455/418 |
| 2014/0323039 A1* | 10/2014 | Hong | ....................... | H04B 7/24 455/39 |
| 2016/0050476 A1* | 2/2016 | Patil | ........................ | H04R 1/08 715/728 |
| 2016/0105767 A1* | 4/2016 | Li | ........................... | H04W 4/02 455/456.1 |
| 2017/0048380 A1* | 2/2017 | Ito | ..................... | H04M 1/72533 |
| 2017/0171894 A1* | 6/2017 | Cohn | ................... | H04W 4/023 |

\* cited by examiner

AUTOMATIC PROMPT AT CALL-END

FIELD

The present disclosure relates to a first audio device comprising a speaker for reproduction of first audio signals, a microphone for reception of second audio signals, and a first transceiver configured for establishing a wireless link according to a short-distance wireless technology. More particularly the first audio device is configured for establishing the wireless link with a second audio device configured for establishing a call.

BACKGROUND

US2008089513A discloses methods and devices for remote determination, control and/or inhibiting the use of a speakerphone of a far end communication device. The methods and devices provide the ability to determine speakerphone use and provide remote control of a far end device's speakerphone, including prompting whether to disable the speakerphone of the far end device if determined to be active. Additionally disclosed are methods and devices of a first communication device having a speakerphone including engaging in a communication with a second communication device, determining if the speakerphone of the first communication device is active, and broadcasting that the speakerphone of the first communication device is active. Also disclosed are methods and devices a first communication device including determining an identity of an auditor at a second communication device and indicating at the first communication device the identity of an auditor at the second communication device.

U.S. Pat. No. 7,233,808 BB discloses a smart Bluetooth interface gateway device that allows a Bluetooth headset to establish an audio connection and communicate with a conventional wireless phone (e.g., a wireless phone that does not have Bluetooth installed). In accordance with the principles of the present invention, the connection is controlled merely by monitoring the presence of sound and tones in the audio stream from an analog audio jack of a conventional wireless phone. The smart Bluetooth interface gateway device preferably attaches to the wireless phone just as a wired headset would. Use of the wireless phone is the same as if a wired headset was plugged in.

U.S. Pat. No. 8,433,245 BB discloses that while a handsfree device being multi-profile compatible is maintaining a connection for a handsfree profile (HFP) with a mobile phone handset, the handsfree device cuts off the connection for the HFP based on a user's operation. After cutting off, the handsfree device establishes a connection for a dial-up network profile (DUN), and subsequently transmits a request for a connection for the HFP while maintaining the connection for the DUN. Subsequently, the handsfree device determines whether the handset is multi-profile compatible according to the response to the request from the handset. Based on the determination that the handset is multi-profile compatible, the handsfree device executes the processes for the HFP while maintaining the connection for the DUN.

SUMMARY

There is a need for a first audio device, such as a speakerphone or headset, a system and a method which provide improved functionality at a call ended event in the first audio device.

Prior art US2008089513A relates to the functionality during a call, and is thus not related to the end of a call.

Disclosed is a first audio device comprising a speaker for reproduction of first audio signals, a microphone for reception of second audio signals, and a first transceiver configured for establishing a wireless link according to a short-distance wireless technology, where the first audio device is configured for establishing the wireless link with a second audio device configured for establishing a call, where the first audio device is configured for transmission of the first and second audio signals of the call via the wireless link, wherein the first audio device is configured for detecting a call-end request during the call, wherein the first audio device is configured for, upon detecting the call-end request, inquiring whether the wireless link between the first audio device and the second audio device should be disconnected.

Also disclosed is a system comprising a first audio device and a second audio device, the first audio device comprising a speaker for reproduction of first audio signals, a microphone for reception of second audio signals, and a first transceiver configured for establishing a wireless link according to a short-distance wireless technology, where the first audio device is configured for establishing the wireless link with a second audio device configured for establishing a call, where the first audio device is configured for transmission of the first and second audio signals of the call via the wireless link, wherein the first audio device is configured for detecting a call-end request during the call, wherein the first audio device is configured for, upon detecting the call-end request, inquiring whether the wireless link between the first audio device and the second audio device should be disconnected.

Also disclosed is a method performed in a first audio device, the first audio device comprising a speaker for reproduction of first audio signals, a microphone for reception of second audio signals, and a first transceiver configured for establishing a wireless link according to a short-distance wireless technology, wherein the method comprises establishing the wireless link with a second audio device configured for establishing a call, transmitting the first and second audio signals of the call via the wireless link, detecting a call-end request during the call, and upon detecting the call-end request, inquiring whether the wireless link between the first audio device and the second audio device should be disconnected.

The first audio device, the system and the method as disclosed provide an improved functionality at a call ended event.

It is a problem of prior art that when a user has used a first audio device, such as a stationary Bluetooth speakerphone, in for example a shared meeting room, the wireless link, e.g. the Bluetooth connection, may be maintained between the first audio device and a second audio device, such as the user's own mobile phone, for example if the user has not moved too far away for the wireless link to be lost. Thus new calls for the second audio device, e.g. the user's own mobile phone, may unintentionally be directed to the first audio device, e.g. the speakerphone in the shared meeting room.

Thus the present first audio device, system and method solves the above problem by providing that when the user ends the wireless call on the first audio device, e.g. Bluetooth speakerphone, the first audio device will directly afterwards ask, request or prompt the user, whether the user wishes to keep the wireless link or disconnect the wireless link, e.g. the Bluetooth connection, between the first audio device, e.g. the speakerphone, and the second audio device, e.g. the user's mobile phone.

It is an advantage of the present first audio device, system and method that it is avoided that shared wireless, e.g. Bluetooth, audio devices, such as a speakerphone in a meeting room, will maintain unintended wireless links, such as Bluetooth links.

This is obtained by when a call between the first audio device and the second audio device is ended, e.g. a Bluetooth audio gateway is closed between a speakerphone and a mobile phone, hence a call-ended event in the software is detected, this call-ended event will entail an automatic prompt regarding whether the wireless link, e.g. Bluetooth link, should be maintained or closed.

It is an advantage that the present first audio device, system and method supports the use case where a shared wireless first audio device, e.g. a Bluetooth speakerphone, needs to have a longer time interval before the wireless link is automatically closed down, e.g. to avoid that a user is unintentionally disconnected from the first audio device, e.g. the speakerphone, prior to an audio meeting using the first audio device, e.g. speakerphone, and the second audio device, e.g. mobile phone, for example when the user(s) wish(es) to set up the wireless link well in advance of when the meeting is planned, e.g. ten minutes before the meeting. The automatic request to the user whether the wireless link should be disconnected given to the user at the call-ended event aims to avoid the case where unintended wireless links are maintained to users who have already finished their audio meeting and hence left the meeting room but where their mobile phone, i.e. second audio device, is still in wireless range of the first audio device, e.g. speakerphone, in the shared meeting room.

Thus the first audio device may be a speakerphone. The speakerphone may be configured to be arranged in a meeting room, such as in a shared meeting room shared by several users. The speakerphone may be a stationary speakerphone, i.e. a speakerphone which is always present in the same position, such as in the same meeting room. The speakerphone may be configured to wirelessly connect with one or more second audio devices, such as the users' mobile phones, for performing calls.

The first audio device may be a headset. The headset may be configured to be arranged on the head of the user when the user is performing calls.

The second audio device may be a mobile phone, a smart phone, a tablet, a computer, a personal computer (pc) configured for calls, a user handset, an internet based phone etc. The second audio device may be a communication device, such as a personal communication device etc.

The first audio device is configured for establishing the wireless link with the second audio device. The second audio device is configured for establishing a call. The call may be established with a third device, such as a third audio device, such as telephone or mobile phone of another user. The first audio device is configured for transmission of the first and second audio signals of the call via the wireless link.

The call may be a telephone call, such as a public switched telephone network (PSTN) call, such as an IP telephony call, such as a mobile phone call via a mobile telecommunications technology, such as 4G etc.

The speaker or output transducer or receiver of the first audio device is configured for reproduction of first audio signals. The first audio signals may be from the conversation partner in the other end of the line, e.g. phone line, e.g. person at the far end.

The microphone is configured for reception of second audio signals. The second audio signals may be from the user of the first audio device, e.g. the users of the speakerphone or the user of the headset.

The first transceiver is configured for establishing a wireless link according to a short-distance wireless technology. The short-distance wireless technology may be Bluetooth technology and/or Digital Enhanced Cordless Technology (DECT) and/or WiFi and/or any suitable short-distance technology. Bluetooth technology may be used as the wireless link since when the first audio device is a speakerphone the users will most likely sit around the speakerphone and thus the short distance that Bluetooth works over is sufficient for the purpose. When the first audio device is a headset, the user will also most likely sit or stand close to the second audio device, which may be a mobile phone which may be placed on the user's desk or in the user's pocket, and thus Bluetooth technology may also be used in this case. DECT may for example be used if the first audio device is a headset and the user is moving away from the second audio device, e.g. mobile phone or pc, during the call, then the longer distance which DECT provides for may allow the user to move quite far away from the second audio device while still maintaining the wireless link.

The first audio device is configured for detecting a call-end request during the call. The call-end request may be an activation of a dedicated "call-end" interface, such as detecting termination of the call by, e.g. a user, activating pressing a "terminate" or "hang-up" button on the first audio device, e.g. the speakerphone, and/or on the second audio device, e.g. the mobile phone, and/or on a third audio device, e.g. a mobile phone of the conversation partner in the other end of the line.

The first audio device is configured for, upon detecting the call-end request, inquiring whether the wireless link between the first audio device and the second audio device should be disconnected or maintained. Thus upon detecting the call-end request, the first audio device is configured for inquiring whether the wireless link to the second audio device should be disconnected.

One or more call-end requests may be detected by the first audio device. Inquiring whether the wireless link should be disconnected may comprise requesting and/or prompting and/or asking and/or pinging a user, e.g. the user of the first audio device and/or the user of the second audio device.

In some embodiments first transceiver is a Bluetooth transceiver. Thus the wireless link may be a Bluetooth link. A second transceiver of the second audio device should then also be a Bluetooth transceiver such that the first audio device and the second audio device can make the wireless Bluetooth link.

In some embodiments the call-end request is performed upon the first audio device detecting an absence of the user. The absence of the user may be detected as a lack of proximity of the user to the first audio device, e.g. if the user has moved away from the speakerphone or headset. Thus the first audio device may perform the call-end request.

In some embodiments the absence of the user is detected as a biometric silence. Biometric measurements may comprise heart rate reading in the headset, temperature reading in the headset etc. Thus if no heart rate is read in the headset or no temperature corresponding to the temperature of a user is read in the headset, this is a biometric silence meaning that the user is not wearing the headset and thus this may mean that the user is absent and thus that the call may be ended.

Body coupled communication (BCC) may be used for biometric measurements. Body coupled communications (BCC), or also called body-based communication, (BBC) or near-body communication, (NBC), has been proposed as a promising alternative to radio frequency (RF) communication as a basis for body/personal area network (BAN/PAN) communication. BCC allows for an exchange of information between devices which are in contact with or in close proximity of the body of a user. This can be achieved by the transmitting BCC-/BAN-antenna that provide a capacitive or galvanic coupling of low-energy electrical fields onto the body surface, i.e. leakage currents with a small magnitude is set to spread out over the human body. The small currents are then detected by a receiver BCC antenna, located on the same body. Thus, signals are conveyed over the body instead of through the air. As such, the communication is confined to the volume close to the body in contrast to RF communications, where a much larger volume is covered. Therefore, communication is possible between devices situated on, connected to, or placed close to the body. The power consumption of BCC-antennas is very low. The first audio device such as the headset may comprise BCC and BAN functionality thus detecting whether the headset is on the user's head. If the headset is on the users head, the headset is in contact with the user's skin allowing for BCC signals to convey on the body. If the headset is not on the user's head or in the user's hand etc., the headset is not in contact with the user's skin and thus no BCC signals convey on the body. This may be used for determining whether the user is present or absent, and if the user is absent, the call-end request may be performed.

In some embodiments the absence of the user is detected as an accelerometer silence. The accelerometer silence may be due to no movements of the user and may thus indicate that the user is absent. The accelerometer measuring the acceleration may be present in the first audio device. If the first audio device is a speakerphone, an accelerometer of the speakerphone may detect if there are movements on the table where the speakerphone is placed. If movements are detected by the accelerometer, this may indicate that users are present at the table. If no movements are detected by the accelerometer, this may indicate that no users are present at the table of the speakerphone and thus a call-end request may be performed. If the first audio device is a headset, an accelerometer of the headset may detect if there are movements of the headset. If movements are detected by the accelerometer, this may indicate that the headset is on the user's head. If no movements are detected by the accelerometer, this may indicate that the headset is not on the user's head, and thus the user may be absent and thus a call-end request may be performed.

The accelerometer may be present in the second audio device. If the second audio device is a mobile phone, an accelerometer of the mobile phone may detect if there are movements of the mobile phone. If movements are detected by the accelerometer, this may indicate that the mobile phone is in the user's hand or pocket. If no movements are detected by the accelerometer, this may indicate that the mobile phone is not in the user's hand or pocket but lying still on a table or desk. Both movements and no movements of the mobile phone may indicate absence or presence of the user.

The biometric measurements from the first audio device may be combined with the biometric measurements from the second audio device to derive a presence or absence of the user.

The biometric silence may be measured over a predetermined or predefined time interval, such as two minutes, five minutes, ten minutes etc.

In some embodiments the absence of the user is detected as a microphone input decreased to a certain microphone input threshold level. If the microphone input is below the threshold level this corresponds to that no audio is received in the microphone and thus that no users' are speaking, and this may indicate that the users are absent and thus a call-end request may be performed.

In some embodiments the absence of the user is detected as a distance increase between the first audio device and the second audio device to a certain distance threshold level. If the distance between the first audio device and the second audio device is increased, this may mean that the user carrying the second audio device, e.g. a mobile phone on the hand or pocket of the user, is moving away from the first audio device, e.g. a speakerphone on a table in a meeting room or a headset at a pc in the office. This distance increase may thus indicate that the user is absent and thus the call-end request may be performed.

In some embodiments the call-end request is succeeded by a call-end event which is notified as an auditory notification and/or a visual notification and/or a tactile notification. The call-end event notifies that the call is now ended. The call-end event may be notified by the first audio device and/or by the second audio device. Thus the call-end event may be an audio notification, such as a voice notification, such as a voice saying "call is ended" or something similar, or a sound notification, such as a sound indicating that the call is ended. The audio notification may be provided by the first and/or the second audio device. The call-end event may be a visual notification, such as a flashing light, on the first and/or second audio device. The call-event may be a tactile notification, such as a vibration in the first and/or the second audio device.

In some embodiments the call-end request is initiated by the first audio device. Thus a speakerphone or headset may initiate, perform and/or conduct the call-end request.

In some embodiments the call-end request is initiated by the second audio device. Thus a mobile phone, pc, handset etc. may initiate, perform and/or conduct the call-end request.

In some embodiments the call is with a third audio device, and the call-end request is initiated by the third audio device. The third audio device is the far end device, e.g. a mobile phone or a speakerphone or a headset used by the conversation partner in the other end of the line. If the far end conversation partner hears that first audio device user is away, then the far end user may end the call on the third audio device. The far end user may activate a call-end button on the third audio device.

In some embodiments the call-end request is an activation of a dedicated call-end interface. Thus the user may activate a call-end button on the first audio device and/or on the second audio device. The far end user may activate a call-end button on the third audio device.

In some embodiments the call-end request is performed by a user of the first audio device and/or the second audio device and/or the third audio device. Thus the user may actively press a button or the like on one of the devices for requesting to end the call.

In some embodiments the inquiry whether the wireless link between the first audio device and the second audio device should be disconnected is an auditory and/or visual and/or tactile notification from the first audio device.

In some embodiments the inquiry whether the wireless link between the first audio device and the second audio device should be disconnected is an auditory and/or visual and/or tactile notification from the second audio device.

The disconnection inquiry may be notified by the first audio device and/or by the second audio device. Thus the disconnection inquiry may be an audio notification, such as a voice notification, such as a voice saying "should wireless link be disconnected?" or something similar, or a sound notification, such as a sound indicating the disconnection inquiry. The audio notification may be provided by the first and/or the second audio device. The disconnection inquiry may be a visual notification, such as a flashing light, on the first and/or second audio device. The disconnection inquiry may be a tactile notification, such as a vibration in the first and/or the second audio device.

In some embodiments upon an acceptance of disconnection of the wireless link, the wireless link is disconnected. The disconnection may be notified by the first audio device and/or by the second audio device. Thus the disconnection may be an audio notification, such as a voice notification, such as a voice saying "the wireless link is disconnected" or something similar, or a sound notification, such as a sound indicating the disconnection. The audio notification may be provided by the first and/or the second audio device. The disconnection may be a visual notification, such as a flashing light, on the first and/or second audio device. The disconnection may be a tactile notification, such as a vibration in the first and/or the second audio device.

In some embodiments the acceptance of disconnection is performed by a user of the first audio device and/or the second audio device and/or the third audio device. The user may be the user who had the call and then accepts the disconnection of the wireless link after the call is ended. The acceptance may be performed by the user on the first audio device, e.g. on a speakerphone when the user is still in the meeting room, or the acceptance may be performed by the user on the second audio device, e.g. on the mobile phone when the user has left the meeting room where the speakerphone is. The acceptance may be performed by the user on the first audio device, e.g. on the headset when the call is ended, when the user is still in his office, or on the second audio device, e.g. mobile phone, when the user has left the office where the headset is. The user may accept the disconnection on the second audio device, e.g. mobile phone, when the user is still next to the first audio device, e.g. when the user is still in the meeting room where the speakerphone is, or when the user is still in the office where the headset is.

The acceptance may be performed by other persons in the meeting room, who is about to use the first audio device, e.g. the speakerphone in the meeting room for a new call. If the other persons realize that the wireless link, e.g. Bluetooth link is still connected from the previous meeting call, the other persons may be able to perform and accept the disconnection.

Alternatively and/or additionally to the near-end user performing the disconnection as described above, the acceptance may be performed by a far-end caller, such as by a user of the third audio device, present in the far end, e.g. in the other end of the telephone or call line. In this case, the first audio device at the near-end may be configured to communicate with the third audio device at the far-end, such as configured to communicate over long distances, such as for example by means of a cloud system. This may be implemented by integration of a gateway in the first audio device and/or in the second audio device and/or in the third audio device, such that the first, second and/or third audio device can be connected to the internet separately or independently from each other.

The time interval between the call-end request or event and the inquiry for the disconnection of the wireless link may be within seconds or minutes, such as 10 second, 20 seconds, 30 seconds, 40 seconds, 50 second, one minute, two minutes, three minutes etc.

The present invention relates to different aspects including the first audio device described above and in the following, and corresponding second audio devices, systems, system parts, methods, devices, networks, kits, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

Figure 1:
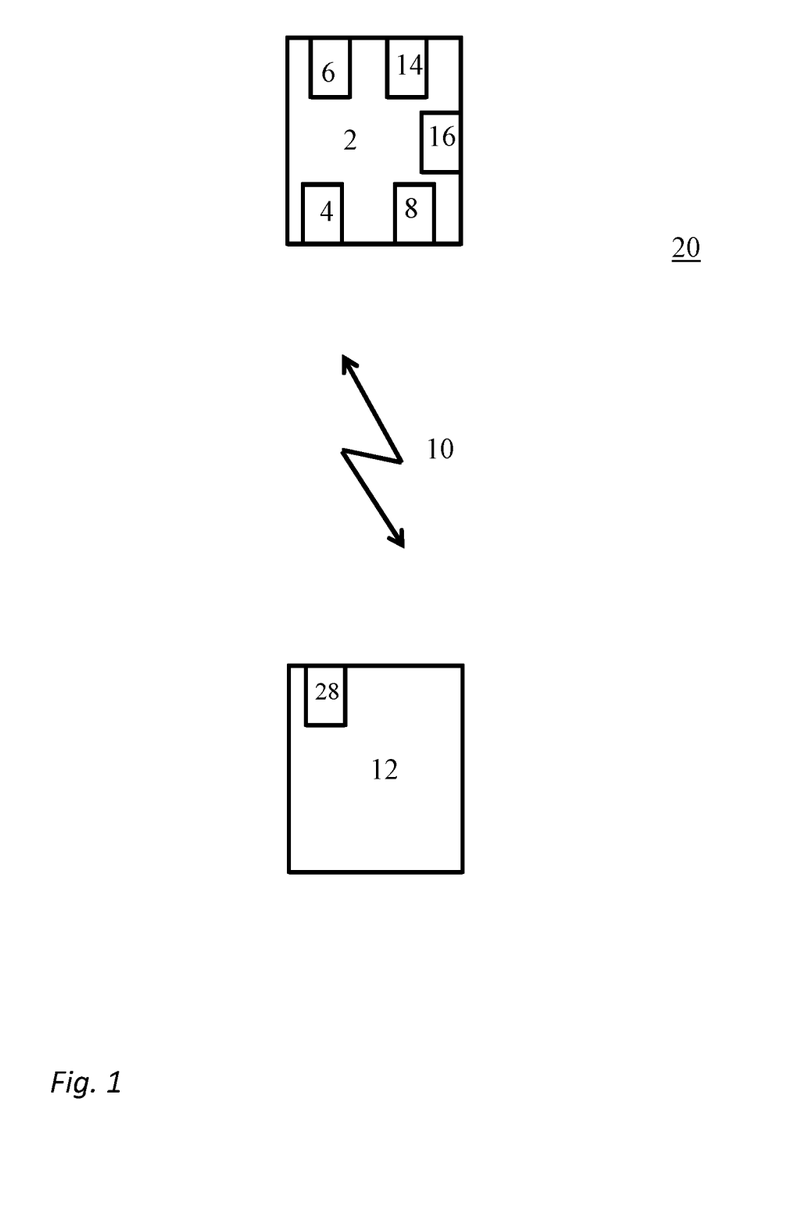
FIG. 1 schematically illustrates an example of a first audio device.

FIG. 1 schematically illustrates an example of a first audio device 2. The first audio device 2 comprises a speaker 4 for reproduction of first audio signals, a microphone 6 for reception of second audio signals, a first transceiver 8 configured for establishing a wireless link 10 according to a short-distance wireless technology. The first audio device 2 is configured for establishing the wireless link 10 with a second audio device 12 configured for establishing a call (not shown). The first audio device 2 is configured for transmission of the first and second audio signals of the call (not shown) via the wireless link 10. The first audio device 2 is configured for detecting a call-end request 14 during the call (not shown). The first audio device 2 is configured for, upon detecting the call-end request 14, inquiring 16 whether the wireless link 10 between the first audio device 2 and the second audio device 12 should be disconnected.

The first transceiver 8 can be a Bluetooth transceiver, and in this case a second transceiver 28 of the second audio device 12 is also a Bluetooth transceiver.

FIG. 1 also schematically illustrates a system 20 comprising the first audio device 2 and the second audio device 12.

Figure 2:
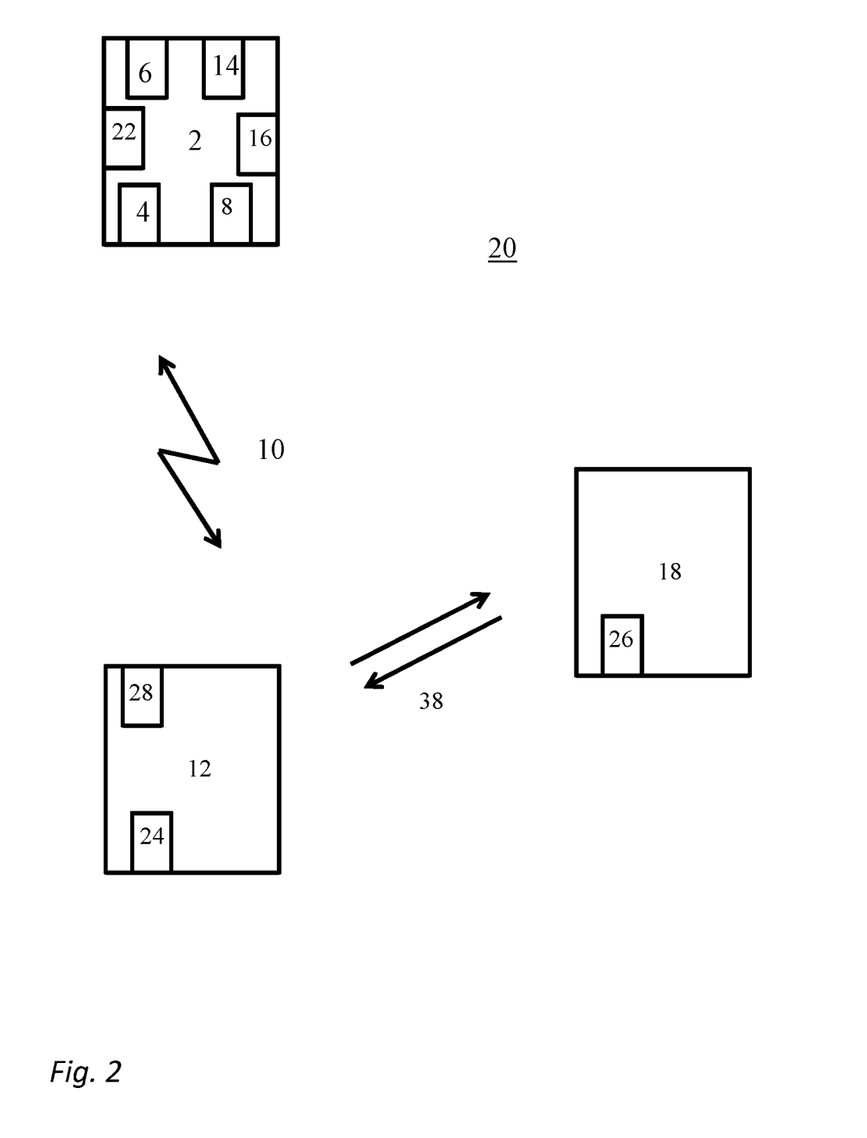
FIG. 2 schematically illustrates an example of a first audio device.

FIG. 2 schematically illustrates an example of a first audio device 2. The first audio device 2 comprises a speaker 4 for reproduction of first audio signals, a microphone 6 for reception of second audio signals, a first transceiver 8 configured for establishing a wireless link 10 according to a short-distance wireless technology. The first audio device 2 is configured for establishing the wireless link 10 with a second audio device 12 configured for establishing a call 38. The first audio device 2 is configured for transmission of the first and second audio signals of the call 38 via the wireless link 10. The first audio device 2 is configured for detecting a call-end request 14 during the call 38. The first audio device 2 is configured for, upon detecting the call-end request 14, inquiring 16 whether the wireless link 10 between the first audio device 2 and the second audio device 12 should be disconnected.

The call 38 is with a third audio device 18. The call-end request can be initiated and/or performed by the first audio device 2 and/or by the second audio device 12 and/or by the third audio device 18. The call-end request can be an activation of a dedicated call-end interface 22 on the first audio device 2, and/or activation of a dedicated call-end interface 24 on the second audio device 12, and/or activation of a dedicated call-end interface 26 on the third audio device 18. The dedicated call-end interface 22, 24, 26 may be a button such as a soft key or hard key on the device.

FIG. 2 also schematically illustrates a system 20 comprising the first audio device 2 and the second audio device 12. The third audio device 18 may or may not be a part of the system 20.

Figure 3:
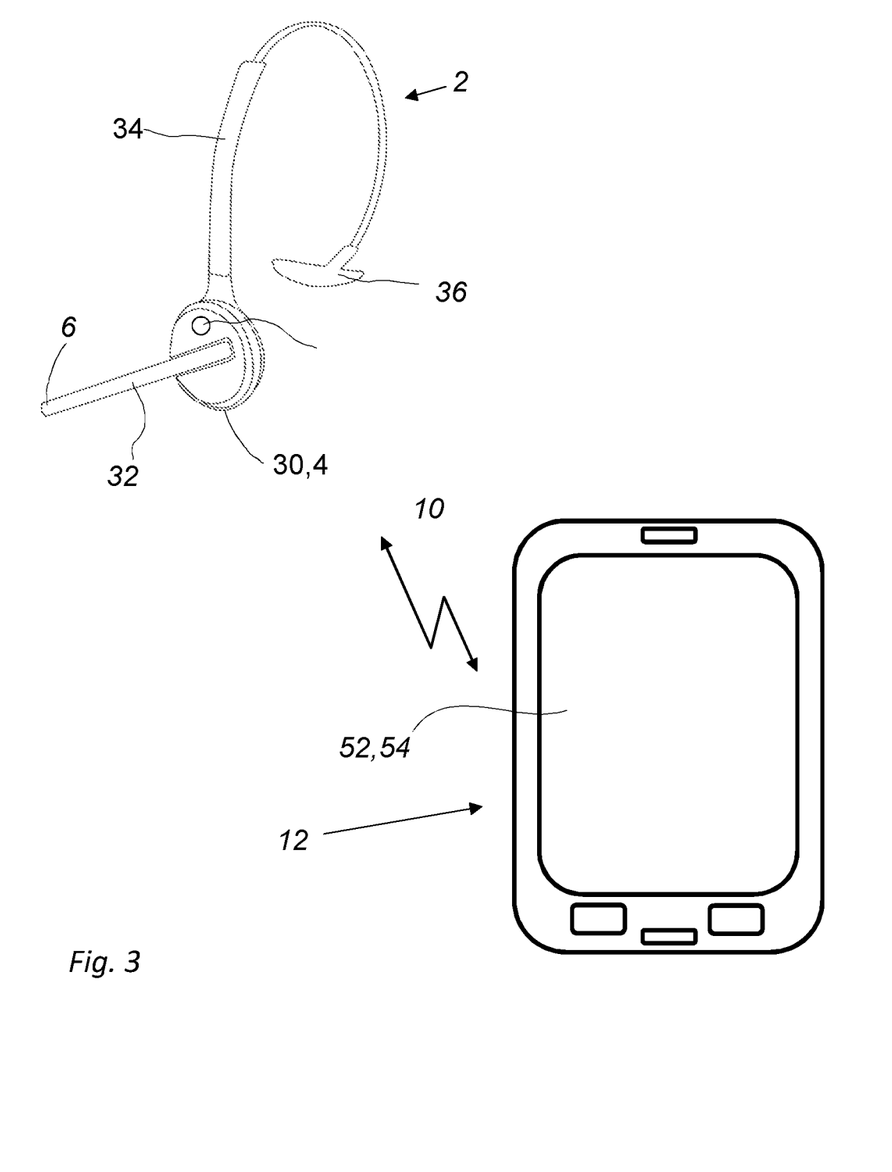
FIG. 3 schematically illustrates an example of a first audio device and a second audio device.

FIG. 3 schematically illustrates an example of a first audio device 2 and a second audio device 12, where the first audio device 2 is illustrated as a headset and the second audio device 12 is illustrated as a mobile phone.

The first audio device 2 is illustrated as a headset 2 comprising an earphone 30 comprising a speaker 4 for reproduction of first audio signals, where the earphone 30 is configured to be placed over the ear of a user such that the user can hear the first audio signals transmitted to the headset. The headset 2 comprises a microphone boom 32 attached to the earphone, where the microphone boom 32 comprises one or more microphones 6 for reception of second audio signals i.e. for capturing the voice of the user. The headset 2 comprises a headband 34 configured to rest on the top of the head of the user wearing the headset 2, and a part 36 supporting the headset 2 to the head of the user at the ear opposite the ear where the earphone 30 is placed. The first audio device 2 is configured for establishing the wireless link 10 with the second audio device 12 configured for establishing a call. The first audio device 2 is configured for transmission of the first and second audio signals of the call via the wireless link 10.

The second system part 12 is illustrated as a mobile phone, such as a smart phone.

The second audio device may also be a tablet, a personal computer (pc) etc.

The second audio system 12 comprises a display 52 comprising a screen 54.

The headset 2 and the mobile phone 12 are configured to be connected in the wireless mode 10 by means of a first transceiver (not shown) in the headset 2 and a second transceiver (not shown) in the mobile phone 12.

Figure 4:
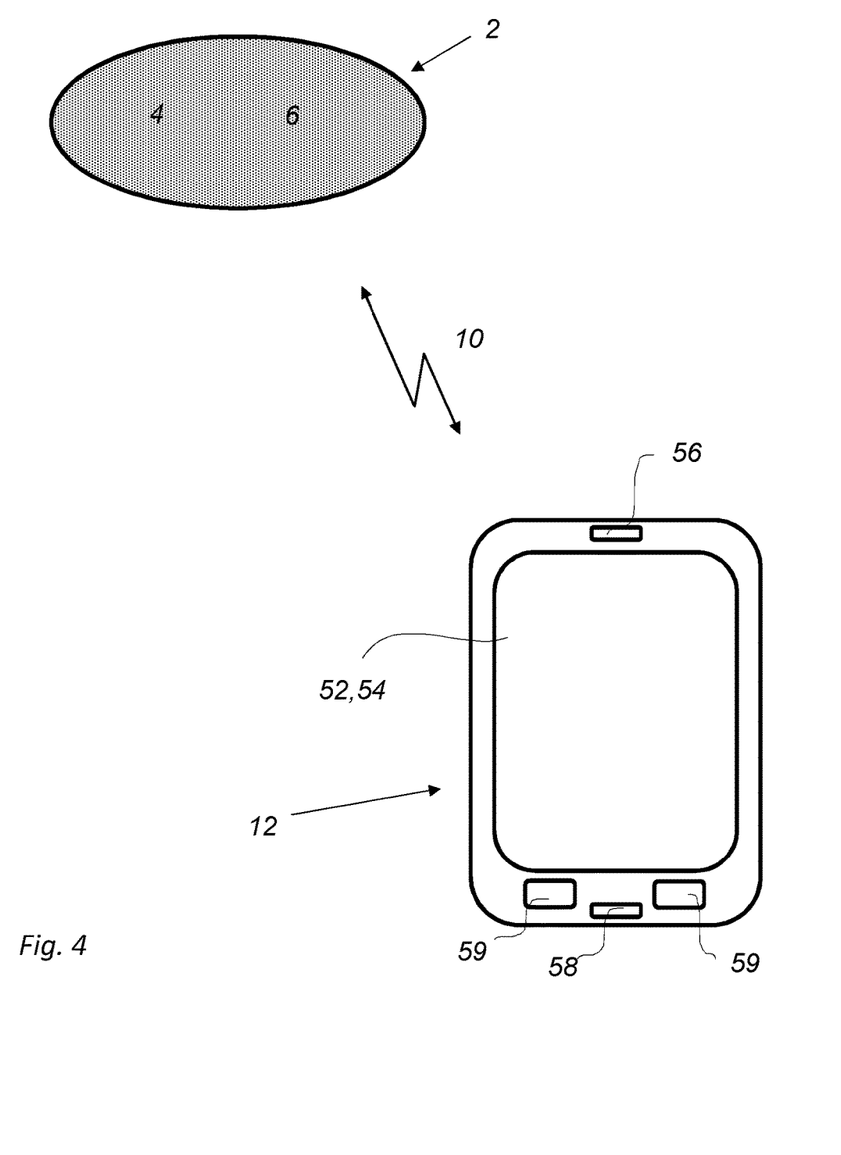
FIG. 4 schematically illustrates an example of a first audio device and a second audio device.

FIG. 4 schematically illustrates an example of a first audio device 2 and a second audio device 12, where the first audio device 2 is illustrated as a speakerphone and the second audio device 12 is illustrated as a mobile phone. The speakerphone 2 is configured to be placed on a table or desk, and the users may be arranged around the speakerphone 2 such that the voices of all the users can be captured by the microphone(s) 6 of the speakerphone 2, and such that all the users can hear the audio signal transmitted to the speakerphone 2 through the speaker(s) 4 of the speakerphone 2.

The first audio device 2 is illustrated as a speakerphone 2 comprising a speaker 4 for reproduction of first audio signals, such that the user(s) can hear the first audio signals transmitted to the speakerphone 2. The speakerphone 2 comprises one or more microphones 6 for reception of second audio signals i.e. for capturing the voice(s) of the user(s).

The first audio device 2 is configured for establishing the wireless link 10 with the second audio device 12 configured for establishing a call. The first audio device 2 is configured for transmission of the first and second audio signals of the call via the wireless link 10.

The second system part 12 is illustrated as a mobile phone, such as a smart phone.

The second audio device may also be a tablet, a personal computer (pc) etc.

The second audio system 12 comprises a display 52 comprising a screen 54.

The speakerphone 2 and the mobile phone 12 are configured to be connected in the wireless mode 10 by means of a first transceiver (not shown) in the speakerphone 2 and a second transceiver (not shown) in the mobile phone 12.

Figure 5:
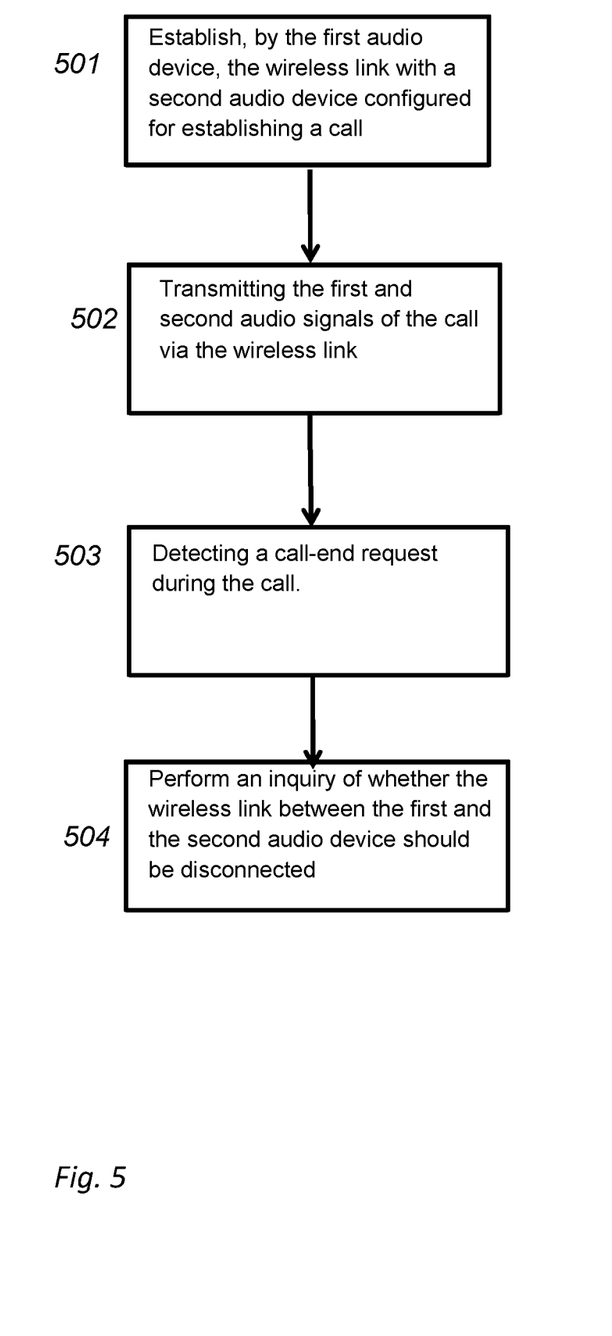
FIG. 5 schematically illustrates an example of a flow chart of a method performed in a first audio device.

FIG. 5 schematically illustrates an example of a flow chart of a method performed in a first audio device. The first audio device comprises a speaker for reproduction of first audio signals, a microphone for reception of second audio signals, and a first transceiver configured for establishing a wireless link according to a short-distance wireless technology. The method may comprise a number of steps.

In a step 501 the wireless link is established with a second audio device configured for establishing a call.

In a step 502 the first and second audio signals of the call are transmitted via the wireless link.

In a step 503 a call-end request is detected during the call.

In a step 504 an inquiry is performed of whether the wireless link between the first audio device and the second audio device should be disconnected, upon detecting the call-end request.

Figure 6:
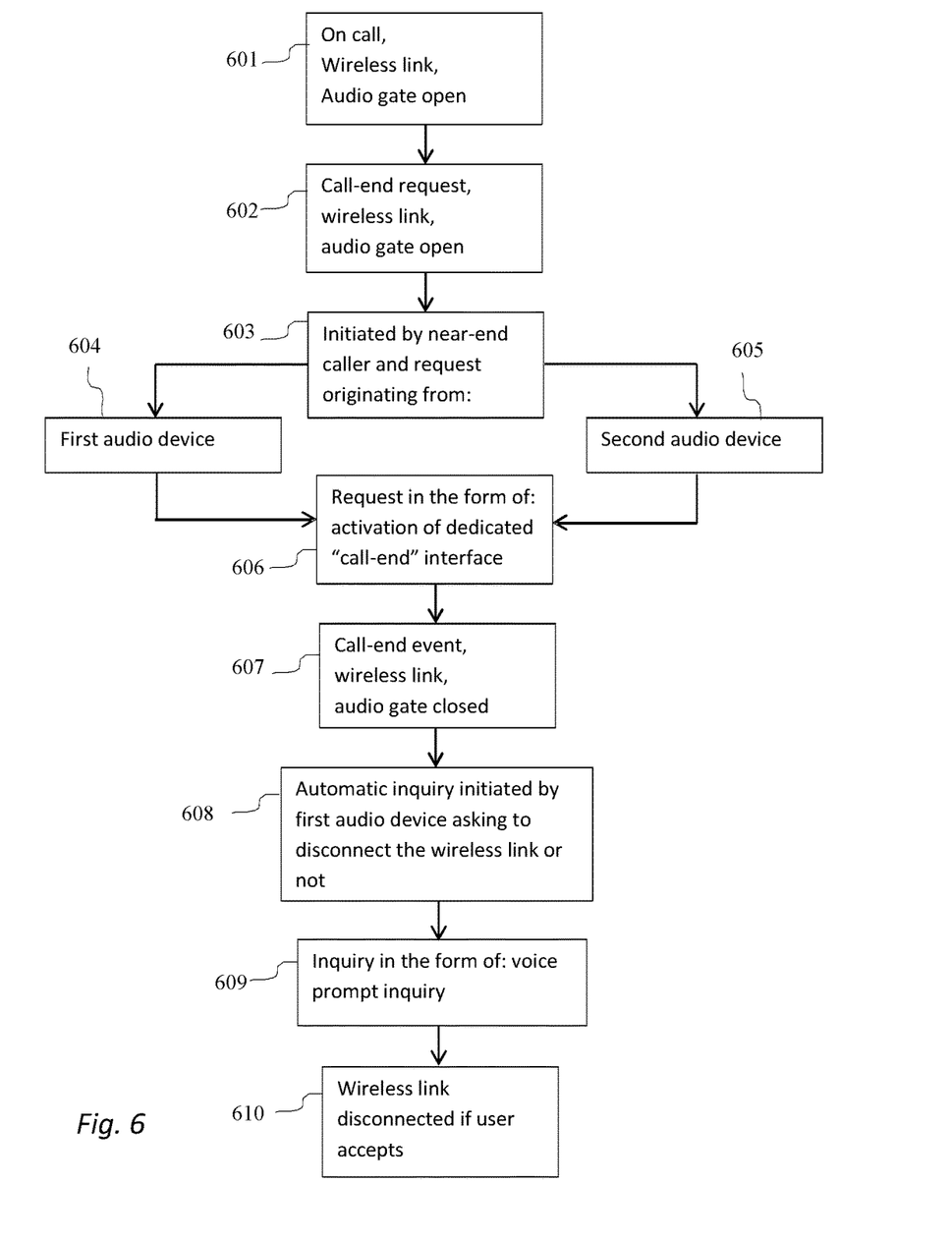
FIG. 6 schematically illustrates an example of a flow chart of a method performed in a first audio device and/or in a second audio device.

FIG. 6 schematically illustrates an example of a flow chart of a method performed in a first audio device and/or in a second audio device.

In step 601 the call is on, the wireless link is connected and the audio gate is open.

In step 602 a request for a call-end is performed. The wireless link is connected and the audio gate is open.

In step 603 it is illustrated that the call-end request of step 602 is initiated by the near-end caller, i.e. the user of the first and/or second audio device. The call-end request can thus originate from the first audio device as seen in step 604 and/or from the second audio device as seen in step 605.

In step 606 the call-end request from the first audio device in step 604 and/or from the second audio device in step 605 is in the form of an activation of a dedicated call-end interface.

In step 607 a call-end event is registered. The wireless link is connected, but the audio gate is now closed as the call is ended.

In step 608 an automatic inquiry initiated by the first audio device is performed asking whether the wireless link should be disconnected or maintained.

In step 609 it is illustrated that the inquiry is in the form of a voice prompt inquiry.

In step 610 the wireless link is disconnected if the user accepts this.

Figure 7:
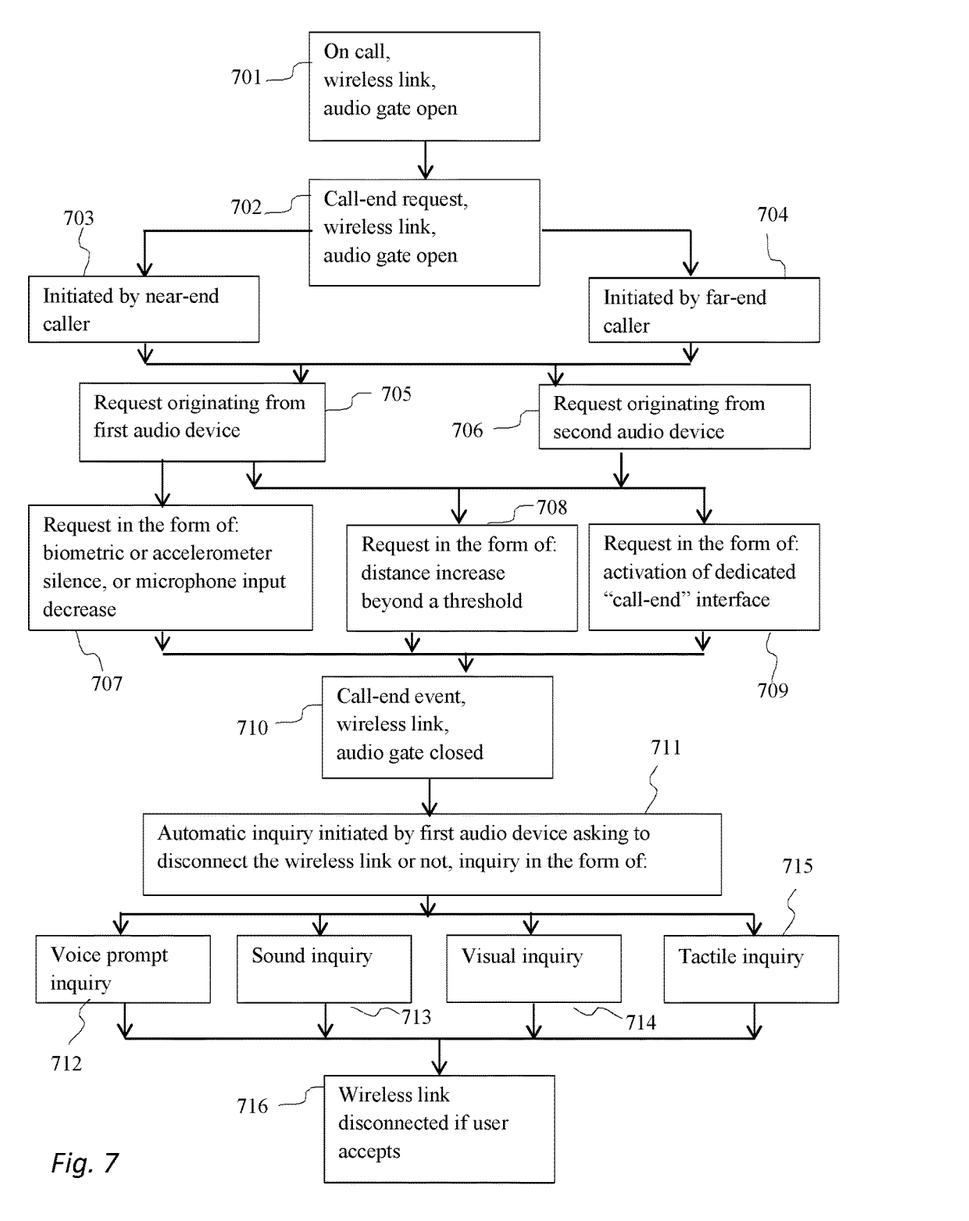
FIG. 7 schematically illustrates an example of a flow chart of a method performed in a first audio device and/or in a second audio device.

FIG. 7 schematically illustrates an example of a flow chart of a method performed in a first audio device and/or in a second audio device.

In step 701 the call is on, the wireless link is connected and the audio gate is open.

In step 702 a request for a call-end is performed. The wireless link is connected and the audio gate is open. The call-end request can be initiated by the near-end caller and/or by the far-end caller.

In step 703 the case where the call-end request of step 702 is initiated by the near-end caller, i.e. the user of the first and/or second audio device, is illustrated.

In step 704 the case where the call-end request of step 702 is initiated by the far-end caller, i.e. the user of the third audio device, is illustrated.

In both cases, i.e. step 703 or step 704, the call-end request can originate from the first audio device and/or from the second audio device. This is illustrated in step 705, where the request is originating from the first audio device, and in step 706 where the request is originating from the second audio device.

When the request is originating from the first audio device as in step 705, the request for the call-end can be in the form of a biometric silence and/or an accelerometer silence and/or a microphone input decreased to a certain threshold level of the first audio device as seen in step 707.

When the request is originating from the first audio device as in step 705 and/or from the second audio device as in step 706, the request for the call-end can be in the form of a distance increase between the first audio device and the second audio device beyond a certain predefined threshold as seen in step 708.

When the request is originating from the first audio device as in step 705 and/or from the second audio device as in step 706, the request for the call-end can be in the form of an activation of a dedicated call-end interface as seen in step 709.

In step 710 a call-end event from any of step 707, step 708 and/or step 709 is registered. The wireless link is connected, but the audio gate is now closed as the call is ended.

In step 711 an automatic inquiry initiated by the first audio device is performed asking whether the wireless link should be disconnected or maintained. The inquiry may be in the form of a voice prompt inquiry as seen in step 712, and/or in the form of a sound inquiry as seen in step 713, and/or in the form of a visual inquiry as seen in step 714 and/or in the form of a tactile inquiry as seen in step 715.

In step 716 following any of steps 712, 713, 714 and/or 715 the wireless link is disconnected if the user accepts this.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES 2 first audio device
4 speaker
6 microphone
8 first transceiver
10 wireless link
12 second audio device
14 call-end request
16 inquiry whether to disconnect the wireless link
18 third audio device
20 system
22 call-end interface on the first audio device
24 call-end interface on the second audio device
26 call-end interface on the third audio device
28 second transceiver
30 earphone
32 microphone boom
34 headband
36 part supporting the headset to the head of the user
38 call
52 display
54 screen
501 step of establishing the wireless link
502 step of transmitting first and second audio signals
503 step of detecting a call-end request
504 step of inquiring to disconnect wireless link
601-610 method steps of method
701-716 method steps of method

The invention claimed is:

1. A first audio device comprising:
   a speaker for reproduction of first audio signals,
   a microphone for reception of second audio signals,
   a first transceiver configured for establishing a wireless link according to a short-distance wireless technology,
   where the first audio device is configured for establishing the wireless link with a second audio device configured for establishing a call,
   where the first audio device is configured for transmission of the first and second audio signals of the call via the wireless link,
   wherein the first audio device includes a detector configured for detecting a call-end request during the call,
   wherein the first audio device includes a terminator which is configured for, upon detecting the call-end request, to transmit a query to said second audio device inquiring whether the wireless link between the first audio device and the second audio device should be disconnected; and at a time when there is a response to terminate, said terminator disconnects the first audio device from the second audio device, thereby preventing either audio devices from automatically reconnecting with each other, thereby freeing the first audio device for use with other devices.

2. The first audio device according to claim 1, wherein the first transceiver is a Bluetooth transceiver.

3. The first audio device according to claim 1, wherein the call-end request is performed upon the first audio device detecting an absence of the user.

4. The first audio device according to claim 1, wherein the terminator detects absence of the user is detected as a biometric silence.

5. The first audio device according to claim 1, wherein the call-end request is succeeded by a call-end event which is notified as an auditory notification.

6. The first audio device according to claim 1, wherein the first audio device is a speakerphone.

7. The first audio device according to claim 1, wherein the terminator detects absence of the user is detected as an accelerometer silence.

8. The first audio device according to claim 1, wherein the terminator detects absence of the user is detected as a microphone input decreased to a certain microphone input threshold level.

9. The first audio device according to claim 1, wherein the terminator detects absence of the user is detected as a distance increase between the first audio device and the second audio device to a certain distance threshold level.

10. The first audio device according to claim 1, wherein the call-end request is succeeded by a call-end event which is notified as a visual notification.

11. The first audio device according to claim 1, wherein the call-end request is succeeded by a call-end event which is notified as a tactile notification.

12. A system comprising a first audio device and a second audio device, where the first audio device comprises:
a speaker for reproduction of first audio signals,
a microphone for reception of second audio signals,
a first transceiver configured for establishing a wireless link according to a short-distance wireless technology,
where the first audio device is configured for establishing the wireless link with a second audio device configured for establishing a call,
where the first audio device is configured for transmission of the first and second audio signals of the call via the wireless link,
wherein the first audio device is configured for detecting a call-end request during the call,
wherein the first audio device is includes a detector configured for detecting the call-end request during the call,
wherein the first audio device includes a terminator which is configured for, upon detecting the call-end request, to transmit a query to said second audio device inquiring whether the wireless link between the first audio device and the second audio device should be disconnected; and at a time when there is a response to terminate, said terminator disconnects the first audio device from the second audio device, thereby preventing either audio devices from automatically reconnecting with each other, thereby freeing the first audio device for use with other devices.

13. The system according to claim 12, wherein the second audio device is a user handsets.

14. A method performed in a first audio device, the first audio device comprising a speaker for reproduction of first audio signals, a microphone for reception of second audio signals, and a first transceiver configured for establishing a wireless link according to a short-distance wireless technology,
wherein the method comprises:
establishing the wireless link with a second audio device configured for establishing a call,
transmitting the first and second audio signals of the call via the wireless link,
detecting a call-end request during the call,
upon detecting the call-end request, inquiring whether the wireless link between the first audio device and the second audio device should be disconnected; said inquiring step including detecting microphone input from said second device decreased to a certain threshold level for a predetermined period of time;
and at a time when there is a response to terminate, disconnecting the first audio device from the second audio device, thereby preventing either audio devices from automatically reconnecting with each other, thereby freeing the first audio device for use with other devices.

15. The method according to claim 14, wherein the call-end request is initiated by the first audio device.

16. The method according to claim 14, wherein the call-end request is initiated by the second audio device.

17. The method according to claim 14, wherein the call is with a third audio device, and wherein the call-end request is initiated by the third audio device.

18. The method according to claim 14, wherein the call-end request is an activation of a dedicated call-end interface.

19. The method according to claim 14, wherein the call-end request is performed by a user of the first audio device and/or the second audio device and/or the third audio device.

20. The method according to claim 14, wherein the inquiry whether the wireless link between the first audio device and the second audio device should be disconnected is an auditory notification from the first audio device.

* * * * *